(12) United States Patent
Solomon et al.

(10) Patent No.: US 10,249,207 B2
(45) Date of Patent: Apr. 2, 2019

(54) EDUCATIONAL TEACHING SYSTEM AND METHOD UTILIZING INTERACTIVE AVATARS WITH LEARNING MANAGER AND AUTHORING MANAGER FUNCTIONS

(71) Applicant: TheBeamer, LLC, East Hartford, CT (US)

(72) Inventors: Peter Solomon, West Hartford, CT (US); Brian Weinberg, West Hartford, CT (US); Arthur Michael McIntosh, South Hadley, MA (US); Igor Senderovich, Brookline, MA (US)

(73) Assignee: THEBEAMER, LLC, East Hartford, CT (US)

( * ) Notice: Subject to any disclaimer, the term of this patent is extended or adjusted under 35 U.S.C. 154(b) by 200 days.

(21) Appl. No.: 15/409,718

(22) Filed: Jan. 19, 2017

(65) Prior Publication Data
US 2017/0206797 A1 Jul. 20, 2017

Related U.S. Application Data

(60) Provisional application No. 62/280,573, filed on Jan. 19, 2016.

(51) Int. Cl.
*G09B 7/00* (2006.01)
*G09B 7/08* (2006.01)
*G09B 5/06* (2006.01)
*G09B 5/08* (2006.01)
(Continued)

(52) U.S. Cl.
CPC ............... *G09B 7/08* (2013.01); *G06N 3/006* (2013.01); *G09B 5/065* (2013.01); *G09B 5/08* (2013.01); *G09B 7/04* (2013.01)

(58) Field of Classification Search
CPC ... G09B 7/00; G09B 7/02; G09B 7/04; G09B 7/10; G09B 7/12
See application file for complete search history.

(56) References Cited

U.S. PATENT DOCUMENTS

| 5,870,755 A | 2/1999 | Stevens et al. |
| 8,346,563 B1 * | 1/2013 | Hjelm ................. G10L 15/1822 379/88.01 |
| 9,158,841 B2 | 10/2015 | Hu et al. |

(Continued)

*Primary Examiner* — James S. McClellan
(74) *Attorney, Agent, or Firm* — Michael J. Brown (57) ABSTRACT

An educational system presents an interactive avatar representing a subject matter expert in a particular field on a student's device, where the avatar can respond to queries posed by the student, and accompany the response with additional supporting information. The avatar's responses are based on artificial intelligence comparisons between the student queries and a knowledge base of anticipated questions, responses and learning goals. An authoring manager system employs natural language processing to identify an underlying meaning in the student's query and to add semantically equivalent questions in the knowledge base and internet searches to aid in compiling the list of anticipated questions. A student profile is stored containing student information and a history of the student's interaction with the avatar. Learning manager software, using the learning goals in the knowledge base and a record of the conversation, can compare and assess the student's progress to the learning goals.

27 Claims, 5 Drawing Sheets

(51) Int. Cl.
*G06N 3/00* (2006.01)
*G09B 7/04* (2006.01)

(56) References Cited

U.S. PATENT DOCUMENTS

| | | |
|---|---|---|
| 2008/0120558 A1 | 5/2008 | Nathan et al. |
| 2008/0221892 A1 | 9/2008 | Nathan et al. |
| 2012/0329029 A1* | 12/2012 | Rauta ................. G09B 7/02 434/350 |
| 2013/0029308 A1 | 1/2013 | Graesser et al. |
| 2014/0310614 A1* | 10/2014 | Jones ................. H04L 67/306 715/753 |
| 2015/0269176 A1* | 9/2015 | Marantz ............. G06F 17/3097 707/767 |
| 2015/0278820 A1 | 10/2015 | Meadows |
| 2016/0071302 A1 | 3/2016 | Meadows |
| 2016/0098936 A1 | 4/2016 | Solomon |

* cited by examiner

EDUCATIONAL TEACHING SYSTEM AND METHOD UTILIZING INTERACTIVE AVATARS WITH LEARNING MANAGER AND AUTHORING MANAGER FUNCTIONS

This application claims priority from U.S. provisional patent application No. 62/280,573 filed Jan. 19, 2016.

This invention was made with government support under Award Number 1549522 awarded by the National Science Foundation's Division of Industrial Innovation & Partnership. The government has certain rights in the invention.

FIELD OF INVENTION

The invention is in the field of automated education and learning tools, providing individualized learning experiences using artificial intelligence.

BACKGROUND

A need exists for effective and engaging educational tools to support the teaching of particular subject matter such as science, art and history, and for providing career related learning, such as military, police and fire training and for other education. The need is critical in grades K-12 where there is a teacher shortage, especially in science related subjects. There is also a need to provide additional support for online courses. Avatars called AutoTutors have been developed, but little is done to make these avatars emotionally engaging. Previous artificial intelligence systems seek responses by matching questions to a large subject world, without the use of well-planned responses to anticipated questions so that important learning goals are left unmet. Other technology employs artificial intelligence to match users' questions to anticipated questions and hence deliver the anticipated response. But such systems do not manage the conversation to insure the learning of important topics or provide the ability to assess the level of achieved learning goals. In addition, the creation of the avatar data base with the list of anticipated questions with all possible semantic equivalents, can be a very time consuming chore for the author. So, an additional need exists to provide effective tools to facilitate authoring of the data base.

Prior art patents and patent applications in this field include the following:

U.S. Pat. No. 5,870,755, Method and Apparatus for Capturing and Presenting Digital Data in a Synthetic Interview.

U.S. Pat. No. 9,158,841, Methods Of Evaluating Semantic Differences, Methods Of Identifying Related Sets Of Items In Semantic Spaces, and Systems and Computer Program Products for Implementing The Same.

US Publication No. 20080120558, Systems and Methods for Managing a Persistent Virtual Avatar with Migrational Ability, published May 22, 2008.

US Publication No. 20080221892, Systems and Methods for an Autonomous Avatar Driver; published Sep. 11, 2008.

US Publication No. 20130029308, Methods and Computer Program Products for Teaching a Topic to a User, published Jan. 31, 2013.

US Publication No. 20150278820, Systems and Methods for Executing Cryptographically Secure Transactions Using Voice and Natural Language Processing; published Oct. 1, 2015.

US Publication No. 20160071302, Systems and Methods for Cinematic Direction and Dynamic Character Control Via Natural Language Output; published Mar. 10, 2016.

US Publication No. 20160098936, Educational System for Teaching Science, History and Other Subjects, Peter R. Solomon, published Apr. 7, 2016.

The objects of the present invention are to provide a learning system utilizing an interactive educational expert avatar (referred to an Expert Avatar) representing important contributors to the subject matter being taught, delivered on a computer enabled device, which can provide answers to a student's questions on the subject matter, and with the aid of learning manager software, guide and advise the student in covering important learning goals, and provide a formative assessment of the student's progress to the student and the course instructor.

The present invention is intended to apply to any teaching or training program, for academic, professional, or vocational training, at any level of education. The term "subject matter" is used herein to refer to all different areas or subjects where education, training or simply additional knowledge may be desired, and is not intended to limit the present invention to only academic educational fields of study. For example, the present invention may be used to support students of elementary, middle school, high school, university, graduate and professional schools, vocational training, or may be used to provide an informative resource or reference such as an encyclopedia, biographical database, or trivia database.

The Expert Avatar presents a historically important person, represented by a lookalike avatar in a historically appropriate setting. The Expert Avatar acts as teacher and mentor, intellectually engaging the student, but also emotionally engaging the student through gestures, facial expressions, and movements. The Expert Avatar provides responses by matching a student's question to a database of anticipated queries with pre-scripted responses. Responses will also include graphics or videos to further improve the student's understanding of the Expert Avatar's responses. Only when no match is found, does the Expert Avatar respond from a general database. The narrow focus of each Expert Avatar leads to high accuracy responses and a believable conversation. In addition to being a subject expert, the Expert Avatar will also be a role model for an important figure in the subject's area.

It is a further object of the invention to provide a method for creating expert avatars that is cost effective, scalable, and can encourage public contributions to the Expert Avatar knowledge base. It is a further object of the invention to have persistence of the Learning Manager memory so that the information on a student's prior knowledge and learning preferences is retained from session to session and avatar-to-avatar to further optimize the learning experience for each student. It is a further object of the invention to add game-like features to the system to attract young users and a method of accrediting the Expert Avatars to ensure accuracy of their knowledge bases.

SUMMARY OF THE INVENTION

The Expert Avatar with learning manager and authoring manager is a software-based educational platform delivered on a student's computer or mobile device, to provide scaffolding, expansion, and enrichment of standard course curricula. The Expert Avatar can have a conversation with students, answering questions, showing graphics, making suggestions, and testing the student's understanding of responses. The system can provide a formative assessment of the student's mastery of learning goals. The Expert Avatar and learning manager act as teacher, mentor, and tutor for the students. The authoring manager provides a way to facilitate the cost-effective generation of the database for the Expert Avatar.

The invention comprises a method for teaching courses consisting of lessons in text or other media form, complemented by an online interactive Expert Avatar accessed by the student using an electronic device, having a microphone, speakers, and display screen, wherein the Expert Avatar, which is programmed to have knowledge of the subject being taught by virtue of artificial intelligence software and knowledge bases, can respond to queries from the student with appropriate answers. The Expert Avatar is available to students online to answer their queries, but also can make recommendations of topics about which the student should enquire and can test the student's understanding of the responses. The method employs: (1) a primary knowledge base of anticipated queries and responses for each specific Expert Avatar and its related subject matter; (2) a learning manager database comprising a set of learning goals, ranking of query importance and test questions and answers; (3) natural language processing software to correct spelling errors, correct speech recognition translation errors, translate slang and help interpret the meaning of each query; (4) an automated system for generating alias queries that represent different ways of asking the same question including alias queries that are composed of variably-weighted words as well as symbols to indicate flexible matching to represent the non key word components of the query; (5) a system for identifying the most appropriate response to the student's query; and (6) learning manager software to guide the student in achieving the learning goals and test the student's progress. The method employs automatic speech recognition software for translating the student's speech into text and prerecorded audio files or text to speech software to translate selected responses to the Expert Avatar's voice; a student profile database which can be accessed by the teacher/instructor for a formative assessment of the student's progress and by the student to review progress in achieving the learning goals. In addition, a secondary search routine, operating on a vetted general knowledge base is available to find answers to queries not found in the primary search of the primary knowledge base.

In addition to the anticipated queries and responses for the Expert Avatar, the primary knowledge base will include a learning manager database which provides the learning goals for the courses being given by the teacher/instructor, ranking of the importance of anticipated queries with respect to the learning goals, test questions to be delivered by the Expert Avatar to assess the student's understanding of responses, and the correct answers to the test questions to be compared to the student's answer. The method includes learning manager software to guide the student in topics, select the grade level of the response vocalized by the Expert Avatar, provide test questions to test learning and provide an assessment of the student's progress in attaining the learning goals. The artificial intelligence software includes a learning manager function that will determine from the queries being made by the student, and the student's understanding of the responses as determined by comparing the student's answers to the text questions to the correct answers in the learning manager database, the student's progress in achieving the learning goals. An important innovation of the invention are the learning manager functions which compare the conversation log to the learning goals (that are also included in the primary knowledge base) to create a formative assessment of the student's progress, which is then stored in the student profile database for access by the teacher and student. Based on the student's progress the learning manager may provide suggestions or recommendations through the Expert Avatar of additional queries that the student should make or on topics that the student might like to know about, provide guidance if the student is off topic, increase or decrease the complexity (grade level) of Expert Avatar responses and instruct the Expert Avatar to test the student's understanding of responses previously provided. Continued lack of performance exhibited by the student can result in a simplification of responses and a suggestion from the Expert Avatar to repeat problem area queries. On the other hand, rapid acquisition of the desired learning goals can result in increasing the complexity of responses.

The graphical user interface database will include a library of gestures, facial expressions, body language, movements and vocalizations that convey an engaging emotional quality to the Expert Avatar. The Expert Avatar's likability is important to attract students to use the system.

The system preferably includes authoring manager software and web user interface or other interface, for subject matter experts, teachers, students and others to author the anticipated queries and responses, the learning manager data or other content related to queries in the knowledge base, an interface for authoring the graphic user interface database, an interface for input to the primary knowledge bases and the student profile database by the teacher of the course and an interface in which the Expert Avatar can ask the expert, the teacher, the student, or others for responses to anticipated queries or ask for suggestions on other queries to add to the knowledge base. Regardless of the specific interface (be it a webpage with fields for questions and answers, a spreadsheet, or a conversational dialogue), the system would be able to cue the expert, teacher or student to discuss particular topics and identify sub-topics, sub-sub-topics, and so forth.

The authoring manager may employ artificial intelligence software to assist in generating questions and responses, including semantically equivalent questions, identify key words, additional topic and sub-topics, wild cards to assist in database searches, as well as identifying conflicts within the database and potential resolution thereof. Using natural language processing, the authoring manager will expand existing and new queries and responses to allow for multiple variations of the same or similar queries to generate the same or similar responses.

The method includes authoring manager functions and a user interface for subject matter experts, teachers, and others to input into the knowledge base anticipated queries and responses, learning goals, topic rankings with respect to the goals, and questions for the student with the correct answers to assess the student's understanding of responses, a user interface for authoring the graphic user interface database describing the Expert Avatar model and its environment, and a user interface in which the Expert Avatar engages the expert in natural language interaction such that the Expert Avatar queries the expert, student, teacher or others for information and the author is able change the knowledge base simply by speaking and gesturing as one would in a traditional interview.

In the drawings, the following acronyms are used: XA for Expert Avatar, KB for knowledge base, NLP for natural language processing, AI for artificial intelligence, GUI for graphic user interface, DB for database, Q&A for question and answer, Q&R for query and response, ID for identification, ASR for automatic speech recognition, and TTS for text to speech.

DETAILED DESCRIPTION OF THE PREFERRED EMBODIMENT

Figure 1:
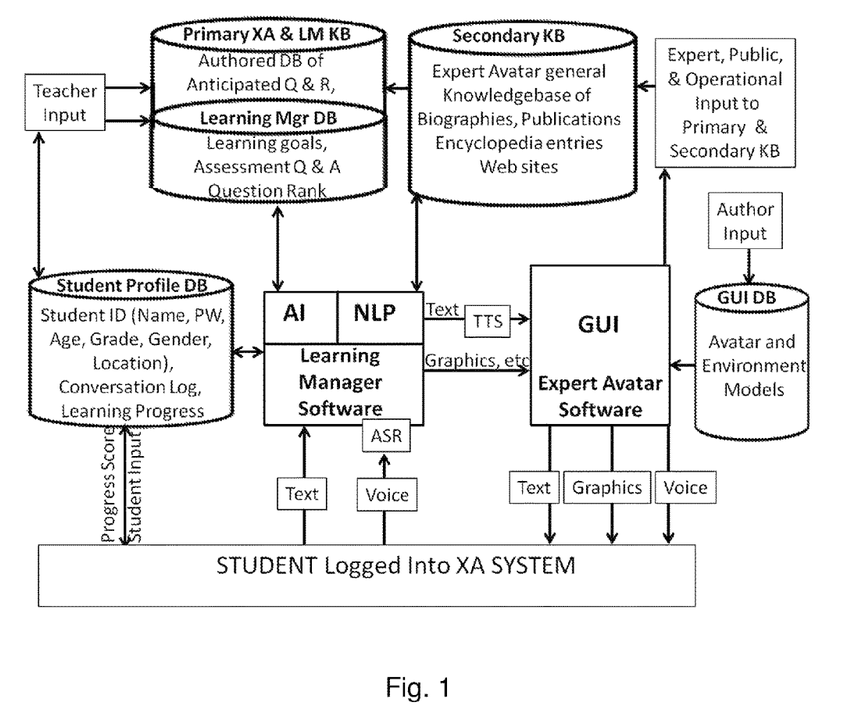
FIG. 1 is a block diagram of the basic components of the system.

The learning system of the present invention presents an avatar representing a subject matter expert (referred to an Expert Avatar) on the display screen of a student's internet connected computer or mobile device, or other connected system, which can verbally respond to queries posed verbally by the student, provide recommendations on topics that the student might like to know about, test the student's understanding of responses previously provided and provide an assessment of the student's progress in achieving important learning goals in the Expert Avatar's area of expertise. As illustrated in FIG. 1, the system employs a first database comprised of two stored knowledge bases: (1) a primary knowledge base of anticipated student questions with the Expert Avatar responses, plus graphics, simulations, voice files, videos, pictures, Expert Avatar movements, etc., to complement the responses; and (2) a secondary knowledge base of generalized knowledge about the Expert Avatar, his or her field, and life and times (e.g., biographies, encyclopedia entries, vetted web pages, publications). The system includes software to match student questions to those in the primary knowledge base. Natural language processing software is employed to correct question spelling errors, correct common automatic speech recognition translation errors, translate slang and convert the question to its underlying meaning. Automatic speech recognition software is employed to convert the student's verbal questions into text, and text to speech software converts the text response into the Expert Avatar spoken response. When questions cannot be matched, a secondary search routine such as ElasticSearch is employed to search the primary knowledge base for a matching question. The corresponding response is given if a high confidence match is achieved. If no match is achieved with the backup artificial intelligence, and requests by the learning system for clarification fail, a search routine applied to the primary knowledge base will generate a response.

In a preferred embodiment of the invention, a student profile database is stored containing student information such as demographics and credentials useful for tracking and optimizing learning. The student profile database may also contain a complete record of the conversation with the Expert Avatar and other Expert Avatars, including the matched responses given, the suggestions by the Expert Avatar, and the results of questions asked of the student by the Expert Avatar to judge the student's understanding of the responses. The course teacher/instructor can access the student profile database to obtain a formative assessment of the student's progress and by the students, for feedback on their progress. Encryption and security procedures are employed to ensure the privacy of the student profile database. In situations where privacy compliance is required, such as COPPA compliance, it may be necessary to encrypt and make secure the data of the end-user.

The system of the invention comprises a number of components which can reside on a single computer system or, more practically, reside on multiple servers linked by digital connections. The digital connections can be made through Wi-Fi, wire, the internet, an intranet, or other common connection means using communication standards such as TCP or UDP. The function of the system, supporting a particular Expert Avatar, is to guide learning of academic subjects, professional training or other education (collectively referred to hereafter as, the courses), by providing answers to a student's questions in the Expert Avatar's area of expertise, (for example, using Isaac Newton as an expert in the field of the physics of forces and motion), test a student's understanding of the Expert Avatar's responses that have been provided, make suggestions for further questions that the student might ask, and provide feedback on the student's progress to the student and the instructor. The Expert Avatar is programmed using the authoring manager to create a knowledge base of anticipated queries and responses, an artificial intelligence system to identify the best response to answer questions about the designated subject, and a learning manager to guide the student to questions related to learning goals. In the case of Isaac Newton, the knowledge base would be populated with the subject of forces and motion, as well as his discoveries, what was known during his lifetime, and his life and times. The Expert Avatar with the learning manager is also designed to test the student's understanding, to track the student's achievement of the topic's learning goals, and to guide the student in achieving those goals and to provide an assessment of progress in achieving the goals. The system is designed to integrate with, and complement other learning materials and/or curricula, such as text books, online guides, e-books, research publications, web pages, games, etc.

The system preferably employs a computer enabled device (such as a computer, smartphone, tablet, robot, toy, etc.), connected to the internet, as the student's access to an Expert Avatar to support a conversation between the student and the Expert Avatar, whereby responses to queries spoken or otherwise asked by the student are delivered verbally, visually, or otherwise by the Expert Avatar. For example, visual communication could be text, gestures, graphics, videos, or sign language. The student's device has at least a microphone and/or keyboard and desirably a video camera for student input, and at least a display screen and/or audio speaker for system output by the Expert Avatar to the student. Other devices such as accelerometers, thermometers, and peripheral devices for measuring location, time and other vectors may be included as input devices. In the system, the student input query by voice or text is sent to artificial intelligence software.

In a preferred embodiment, the artificial intelligence system may consist of a number of software components residing on a single computer or multiple connected servers. The artificial intelligence system performs the following functions: (1) converting the spoken query to text using automatic speech recognition; (2) preferably performing natural language processing analysis of the query to correct spelling errors, translate slang, correct common automatic speech recognition errors and convert the query to its underlying meaning or intent; (3) perform an artificial intelligence comparison of the query to a pre-prepared primary Expert Avatar knowledge base of anticipated queries and text responses to find the first or best match to the student's query, the artificial intelligence system employing a machine learning solution capable of a series of comparisons and qualitative filters, such as IBM Watson, AIML (artificial intelligence markup language), ElasticSearch, chat scripting, or search engine technology, employing neural networks or other self-enhancing mechanisms that provide contextual comparisons to a database; (4) delivering a prerecorded audio file corresponding to the identified best text response or converting said text responses corresponding to a matched query in the primary knowledge base to speech using text to speech software; (5) delivering the speech by an avatar visualized on the student's device display screen, or a connected device, such as a robotic armature or robotic chassis, and controlled by software intended for the manipulation of real-time 3D geometry, such as is often used for games and military applications, and displaying the text on the screen as well; (6) providing accompanying charts, graphs, Expert Avatar behaviors (gestures, facial expressions, actions), simulations, videos and other visual materials to enhance the teaching and communication of the core meaning in the relayed message; (7) providing questions to be asked by the avatar to test the student's understanding of the response; (8) recognizing the student's answer and comparing the answer to expected answers; (9) providing output to a student profile database summarizing the responses received and understood as determined by the students answers to questions, said information to be used for student feedback and teacher formative assessment; (10) providing clarification responses such as "did you mean . . . A or B . . . ?" for the Expert Avatar to deliver in case no match is found in comparison of the student query to the primary knowledge base; (11) performing a search of a primary knowledge base to provide a response if the student's response to requests for clarification still do not produce a match with the anticipated queries of the primary knowledge base; and (12) storing any unanticipated query and its answer for possible addition to the primary knowledge base.

For the purpose of the subject invention, the Expert Avatar will respond to a student's verbal queries verbally and with auxiliary information in the form of graphs, pictures, videos, action and simulations. The response of the Expert Avatar is created using the primary knowledge base containing the subject knowledge and auxiliary information, as well as information on the Expert Avatar's life, the Expert Avatar's contributions to science, previous knowledge on the subject, and information about the times in which the Expert Avatar has lived. The primary knowledge base also contains connected data to facilitate learning of the course, the learning manager database, which includes the learning goals, ranking of the anticipated queries in the primary knowledge base with respect to the learning goals and test questions and answers to assess a student's understanding of responses to the anticipated queries. To facilitate the creation of the primary knowledge base, a web or other interface is made available to allow author input (to be vetted by an editor), from knowledgeable experts, teachers, students and the public.

Authoring manager software may also be employed to provide automatic generation of an initial primary knowledge base. An author can input anticipated queries and their responses into the primary database, as well as the auxiliary material and other information important to the learning goals of the lesson or course, such as whether the query is on a required topic, interesting background, frivolous, or inappropriate. The creation of the primary knowledge base is preferably facilitated by subject experts, teachers, students, and others. All entries will preferably be vetted by the subject expert for accuracy. Entries will be made for all the anticipated questions, the corresponding responses, supplemental graphics that the Expert Avatar will use in augmenting the response and in some cases, voice responses to the query. Each question will be tagged with key words, and a question type such as who, when, what, where, why, how, opinion, advice, explain, etc., to facilitate the generation of alias questions that have the same intent. To support the learning manager, each entry will be ranked in importance with respect to the learning goals, from an important or required goal to a non-important or frivolous goal. Each response will also include scripts for the Expert Avatar to make suggestions to students to keep the student on track with respect to the learning goals, have questions (and correct answers to compare with the student response) to be delivered by the Expert Avatar to determine the student's understanding of previous responses, and have different grade levels for each query which can be adjusted depending on the student's progress. Entries for the knowledge bases can be made by text, or through a second method, utilizing the Expert Avatar interface to allow contributors to respond verbally to questions or requests made verbally by the Expert Avatar.

Unanticipated, but important, queries that students have previously made (and resulted in a response from the Expert Avatar obtained from the search of a knowledge base consisting of general information related to the course such as biographies, web pages, encyclopedia entries and research papers) would be added to the primary knowledge base for continuous improvement of the system. The complete body of information for each query will be used by a natural language processor to deduce the fundamental meaning of a query.

Figure 5:
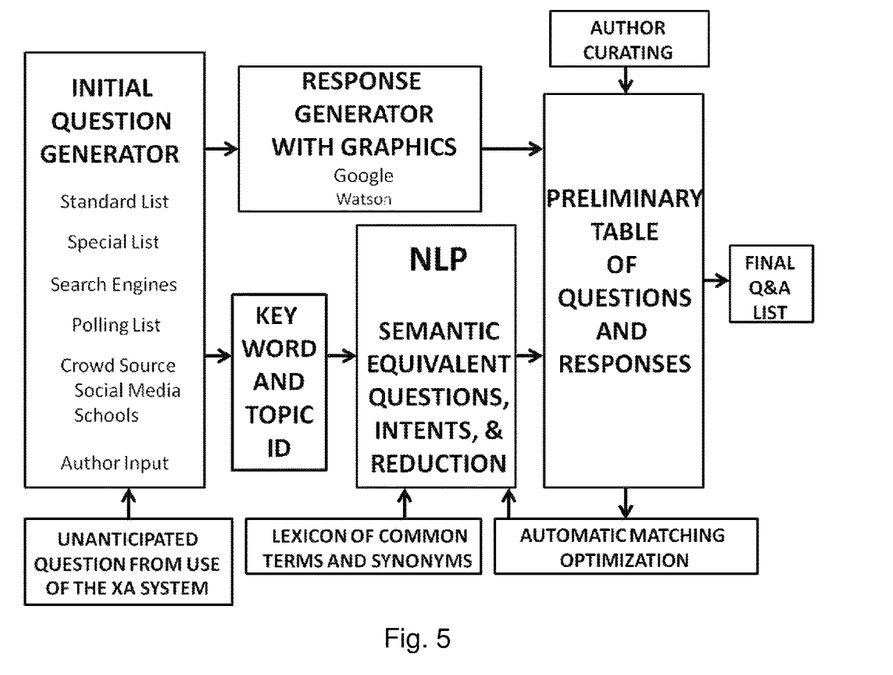
FIG. 5 is a block diagram of the automated authoring manager system designed to facilitate the generation of the knowledge base of anticipated questions and responses.

To facilitate more rapid and cost effective generation of the knowledge base, an authoring manager system is made available to automatically generate an initial list of anticipated questions and provide semantically equivalent questions and candidate responses. These will be the starting point for the author or subject expert to edit the automatically generated KB. Such a system is illustrated in FIG. 5.

In a preferred embodiment of the system, the authoring manager includes software to facilitate the authoring of the primary knowledge base. For example, the authoring manager may consist of a preformatted spreadsheet entry form or a web based set of forms or a combination of the two for providing input to the knowledge base. The forms must facilitate entry of anticipated queries, the corresponding responses, associated id numbers, and learning goal rankings, together with associated test questions, audio references, video references, graphics references, expression and gesture identifiers, topic, key words and other pertinent data. The forms also facilitate the entry of alias queries representing equivalent ways of asking the same question and alternative responses for different grade levels and different amounts of detail.

The authoring manager process may begin with an initial question generator which creates a list of anticipated questions from a variety of sources including data on frequently asked questions collected by internet search engines which are employed to create the auto-complete function. For example, entering the words "why is Albert" into the Yahoo search engine resulted in seven usable questions related to Albert Einstein that are frequently asked. Other sources include standard lists such as when "were you born?" or "where do you live?" which would be asked for any Expert Avatar, crowd source questions solicited on social media and author inputs. As the Expert Avatar is used, and unanticipated questions are received from students, these unanticipated questions would be added to the list of questions in the knowledge base. The authoring manager would also identify responses to the unanticipated questions using search engines such as Google or Watson, for addition to the knowledge base. The questions would then be analyzed to associate a topic and key words. Then natural language processing software would be employed to analyze the initial list to create semantic equivalent questions, basic intents and questions incorporating synonyms and equivalent terms. These operations would create an updated list for automatic matching optimization and finally for the primary author to approve.

In one embodiment of the system, the artificial intelligence system employs a markup, scripting or chat scripting language, such as AIML, riverscript, or other methods for generating chatbot conversational agents. The artificial intelligence system searches the knowledge base to find exact matches between student's questions and one of the anticipated queries. To make a robust Expert Avatar, each query must be expanded to include variations in the wording of each query. The variations may include, and the authoring manager will preferably address, patterns for broad matching, de-emphasizing unimportant words and phrases, inclusion of synonyms and equivalent sounding words generated by automatic speech recognition. The authoring manager software will also facilitate the transition of entries from a spreadsheet, or web form or combination of the two into appropriate knowledge base entries. A search routine such as Elastic Search may be used on the primary knowledge base in cases where the artificial intelligence system fails to find a match.

Figure 2:
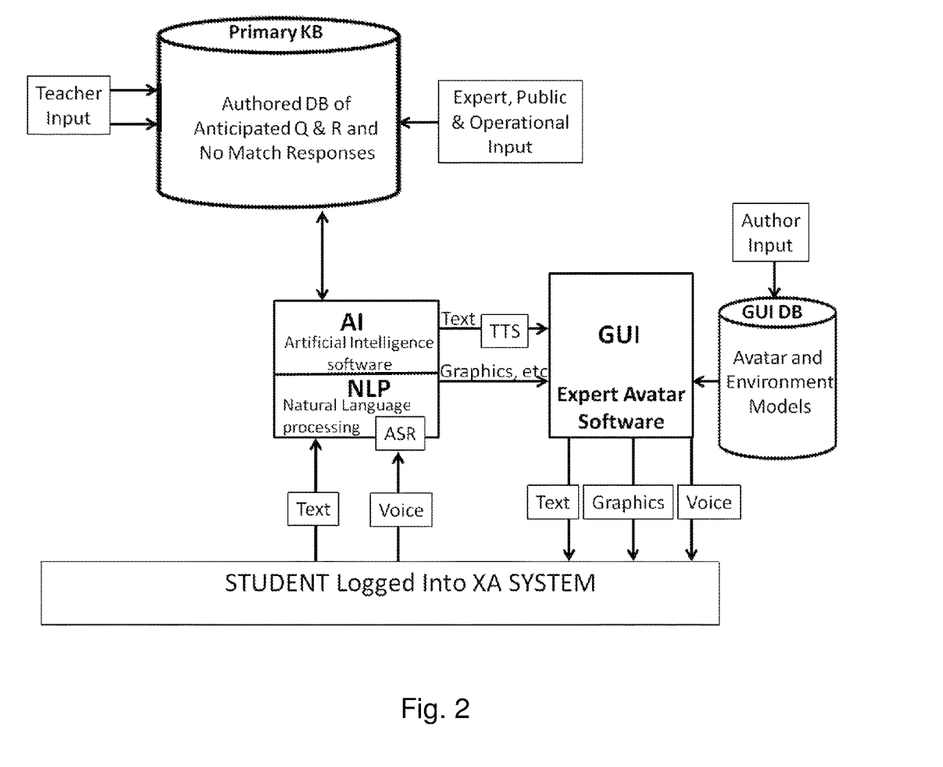
FIG. 2 is a block diagram for a Simple Expert Avatar Response Generator.

The core function which allows the Expert Avatar to provide responses to queries is the response generator. A simple response generator is illustrated in FIG. 2. The figure indicates a student, logged onto the internet connected to the various functions required of the system, such as automatic speech recognition (ASR), natural language processing (NLP), artificial intelligence (AI), text to speech (TTS) generator, and graphical user interface (GUI) which presents the Expert Avatar in an appropriate environment (or other connected devices such as a robot) to deliver voice and auxiliary graphics. These functions can reside on a single computer or may be more easily provided with separate software services located on geographically separated servers with support provided through an aggregator.

In the simple response generator of FIG. 2, the student makes a query verbally, which is input to the automatic speech recognition system, which then converts the query to text. The text is input to the artificial intelligence system, which may have an natural language processing component to first process the query, to correct spelling, correct common automatic speech recognition translation errors, identify grammatical mood, n-grams and other lexical elements to extract the fundamental meaning of the query. For example, input such as "can you tall me yar age" would be translated to "how old are you." The artificial intelligence system then compares the simplified query to the database of anticipated queries. If a match to a query in the knowledge base is found with a high confidence value, the artificial intelligence system delivers the knowledge base's corresponding response to the Text to Speech software for verbal delivery by the Expert Avatar. Alternatively, the response may have a voice file to be delivered by the Expert Avatar. The text response is displayed on the screen as well. The auxiliary graphics from the knowledge base are also delivered using the graphics instructions. If more than one possible match is found with reasonably high confidence values, a response, such as "did you mean A or B?" might be delivered, and after clarification by the student, the appropriate response delivered. If no high confidence value match is found, a request to rephrase the question is made. If this fails to resolve the query, a response is given that the Expert Avatar does not have a response for that query. The gestures and affect of the Expert Avatar can be tailored to match the response. For example, when the learning system does not understand a query, the Expert Avatar may throw its hands up, raise an eyebrow, and angle its head slightly, in a gesture of apology. These gesture and expression libraries may be tailored specifically for learning interactions, and derived from the means by which non-verbal communication is associated with verbal interactions and learning or teaching methods.

Figure 3:
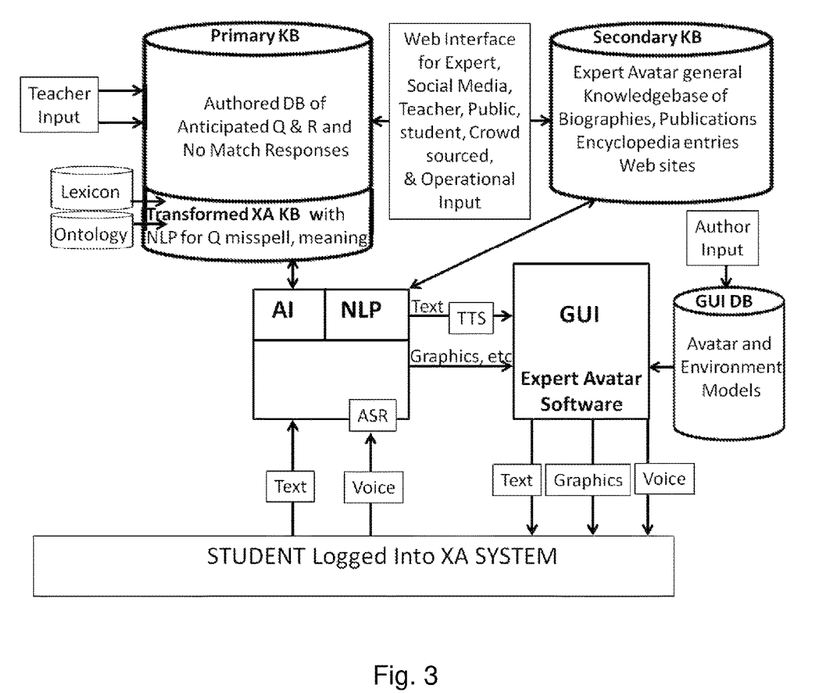
FIG. 3 is a block diagram of an Advanced Expert Avatar Response Generator.

FIG. 3 shows an embodiment of a system that incorporates the simple response generator, but facilitates the creation of a transformed knowledge base in which the meaning of queries is identified using natural language processing, linked to a lexicon and an ontology. The system provides an interface to be used in creating the system to allow the input of anticipated queries, responses, and auxiliary graphics. Subject matter experts input data and curate and edit the knowledge base. Input can also be encouraged from students and teachers through school projects and from the general public through social media requests. A secondary vetted Expert Avatar subject-matter database, containing such materials as biographies, scientific papers, and encyclopedia entries, is also linked to the artificial intelligence to be used for searches when queries for which no match is found remain unresolved after attempts to clarify have failed. At every stage in the development of the primary knowledge base, each query will be augmented with aliases. The purpose of this step is to clarify queries, correct misspellings, reduce queries to more meaningful forms, and add semantically equivalent queries.

In one embodiment of the system, an artificial intelligence system finds a match between the student query and the anticipated questions. The artificial intelligence system initially only finds an exact match. To make this system robust, it is necessary to expand the primary question into a set of alias questions that have the same intent. This includes generating patterns for broad matching, de-emphasizing unimportant words and phrases, inclusion of synonyms and equivalently sounding words generated by automatic speech recognition. Aliases using wild cards may also be used to replace unimportant words or phrases. An additional software component will generate aliases for common question forms. For example, questions requesting an explanation of a concept such as "could you please explain General Relativity" will be expanded to include "describe", "tell me about" "discuss" "talk about" etc. Questions asking for "opinion" will be expanded with "thoughts on", "ideas about", etc. The generating of the alias questions using flexible word weighting, key words, synonyms and equivalent expressions is the most important feature of the authoring manager software.

In a further feature of the artificial intelligence implementation, a secondary artificial intelligence step is employed if the first attempt at matching fails. This secondary artificial intelligence step uses search engine software to look for possible matches between the student queries and the anticipated queries and responses. If this search fails to produce a high confidence match, then the system will revert to the search of the general knowledge base.

Another facilitator of input is the use of the Expert Avatar to ask the subject matter expert to provide responses to anticipate queries and to ask students, teachers, and subject matter experts for their suggestions on queries to include in the knowledge base. For this process, the author replaces the student taking the course and is prompted for responses or queries by the Expert Avatar. The dialog is preferably controlled by authoring manager functions.

Figure 4:
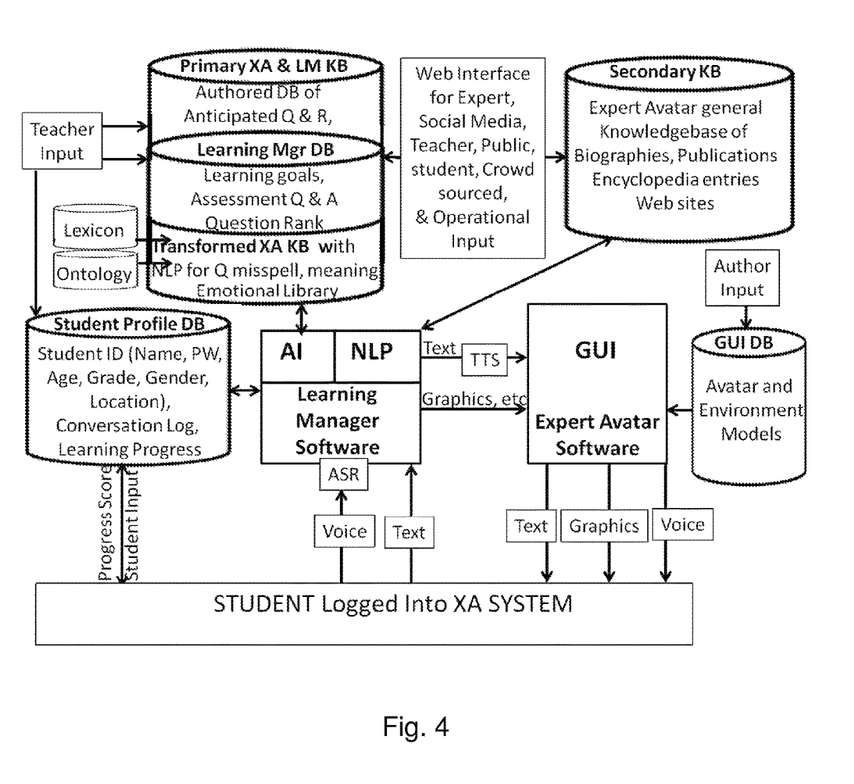
FIG. 4 is a block diagram of the complete Advanced Expert Avatar Learning System.

FIG. 4 illustrates how the advanced response generator is expanded into the learning system. The advance response generator adds the functions of searching the student profile database for history on the student's interactions with the Expert Avatar, as well as adding the learning manager functions to assist in identifying the appropriate query and response match.

The primary knowledge base is augmented with additional information of the learning goals of the course, questions to ask the student to assess the student's understanding of responses, and prompts to be delivered by the Expert Avatar to keep the student focused on the important topics in the course. A software component of the artificial intelligence system called the learning manager software compares the student's progress to the learning goals for the course. Queries and responses may be categorized as required goals, important, inappropriate, frivolous, etc. This ranking is used to score the student's progress. To get a high percentage of completion of the course requirements, the student must master a pre-required metric (such as 51% or 90%) of the required goals and important subject categories.

The Expert Avatars for a given subject can be chosen from among the discoverers, contributors to the subject, other subject experts, or fictional characters including animals or robots. The full user interface is employed during the authoring process to test the accuracy of the automatic speech recognition and the artificial intelligence path comparing the query to anticipated questions and aliases and providing the text response and response number. This user interface, without the response raw data could be used by a student. The Expert Avatar is animated in an appropriate environment using 3D modeling software such as Unity 3D or WebGL. The Expert Avatar might use a blackboard or whiteboard to illustrate a response, or show pictures, simulations, or graphs. Expert Avatars of the modern era could show displays such as videos or physical simulations on a computer or TV screen in their environment. The Expert Avatar model may be created, edited, or augmented with any of a variety of software programs and online services. These may include services to provide maps, news, entertainment, finance, health, search, shopping, and others via a software licensing and delivery model in which the software is licensed as a subscription. In this instance, real-time data, such as the weather, may be mapped onto a portion of the virtual world and the avatar may gesture or interact with it much like newscasters. Expert Avatars of past centuries could show such videos or physical simulations as thought bubbles or other graphic displays. Expert Avatars would also have the ability to walk through virtual environments, provide guided tours, interact with objects as small as beakers or as large as solar systems, and operate within all of the broad range that virtual reality, augmented reality, and mixed reality offer. These interactions with virtual objects would be cued such that the natural language dialogue initiates particular interactions and limits others, while simultaneously collecting information from the end user about their methods of interaction with these virtual objects.

The Expert Avatar can be created from photos or portraits of the subject using software which maps the photo or portrait onto a 3D head model. The model may be generated with any of the methods that are commonly used to generate 3D mathematical models such as NURBs, polygons, voxels and others to input, arrange, associate, and animate by large-scale shape capture systems or by smaller handheld means of scanning 3D objects. This process does not always result in a photorealistic 3D likeness. An improvement to this process can be achieved by adjusting the features of the 3D head (nose length, lip width, head shape, etc.) and matching the resulting 2D full face, profile, or angled profile to original full face, profile or angled profile images. This process may also develop caricatures which are understood as being the same person, but with a different likeness. This process is capable of being automated by selecting points on the face which are to be matched.

Animation may include similar traditional methods, as those described above, or may include libraries that have been built from motion-capture systems, or facial animation may be automatically derived from natural language and/or voice output.

Reputation for the avatar is an important element because it ensures that the avatar has external verification reviews and rankings, from other users, again, similar to social media or movie reviews. Additionally, the authenticated avatar may, therefore, be certified for expert education and to serve as a trainer such that certification boards or other certification entities may provide the avatar with the documentation, approval, or elements that symbolize the certain certification requirements have been met. Because certification processes vary and often require multiple contextual sets of data to be simultaneously understood and replied to multiple aspects of artificial intelligence would be applied as required. For those familiar in the art, the certification process might require multiple and simultaneous forms of reasoning and intelligence, including non-monotonic, cause-and-effect logic, causal and spatial reasoning, reasoning about knowledge, natural language processing and taxonomic representation.

The system, in collecting data, delivering responses, and remembering these responses for each individual has an identity that must be authenticated. While there is the internal management of instances, technically speaking, there is also a "license plate" or unique identifier which allows others, external to the technical operation of the system to trust this avatar and actually enable it to develop a reputation among the users of the system such as an individual user account on most social media sites have today.

The learning manager software receives, from the knowledge base, the learning goals, in the form of the required goals and important responses that the student should receive from the Expert Avatar. The learning manager tracks the student's progress in eliciting these responses by posing the right queries. When a large number of queries have been posed without touching on any required or important topics, the learning manager can select from a list of prompts in the knowledge base to be delivered by the Expert Avatar to redirect the student toward the learning goals. The learning manager may also direct the Expert Avatar to judge the students understanding by asking questions. For example, after covering the subject of Newton's Law F=ma, the Expert Avatar may ask, "if the force, F, on a particular mass, m, is doubled, what is the effect on the acceleration, a?" When a student consistently fails to grasp the meaning of certain responses, the learning manager may direct that responses be delivered consistent with a lower grade level. Students spending most of their time on frivolous or inappropriate queries will not score well. Under such circumstances, the learning manager software will provide input to the Expert Avatar to suggest topics that the student needs to cover.

As an alternative to having the Expert Avatar deliver the suggestions, guidance or testing for the learning manager, a second avatar could appear with or instead of the Expert Avatar to deliver the suggestions, test questions and other mentoring functions. The second avatar would be used in the case of questions about the particular Expert Avatar's work that the individual represented by the Expert Avatar might not be aware of, such as activities that occurred after the individual's death. This can be used to facilitate and steer conversation, as needed, to help present and teach content. The second avatar could be represented by an on-display figure that speaks or by voice alone.

A database will also be created to track the frequency with which anticipated and unanticipated questions are asked, to be used for updating and improving the system's knowledge base. Frequently asked unanticipated queries with answers will be added to the knowledge base. In addition to the web interface for expert authors, a web interface for non-experts can be established to encourage crowd sourcing of database information. This interface can be utilized by teachers, by classes pursuing a class assignment, or by the individuals who want to contribute. The publicly supplied information for the knowledge base, as generated from these inputs, would be organized to facilitate being curated by an appointed expert.

A system interface will also be provided to teachers to input to the knowledge base learning goal scores for queries and to review their student's progress.

In an embodiment of the system the student profile database would be permanently stored so that the information on a student's prior knowledge and learning profile is retained from session to session and avatar to avatar to allow the Learning Manager to optimize the learning experience for each student. For example, if the grade level of responses has been raised for one Expert Avatar, it would remain raised for subsequent avatars.

A preferred embodiment of the system will also include a library of facial expressions, gestures, body language, movements and vocalizations to give emotional depth to the Expert Avatar. The library may be used to display the Expert Avatar in an engaging manner that is appropriate to the conversation and the input by the student.

In an embodiment of the system, the display and response functions of the system may also be embodied in a hardware display, such as a robot or other connected device. The methods of animation that drive the avatar in a 3D space may also be applied to a physical motor. This is applicable to all parts of the avatar animation, or the associated scene graph that accompanies the physical instantiation. This method for driving an avatar or robot are the same in that the instructions for movement of the virtual Expert Avatar's arms are also the instructions for movement of the robot's physical arms.

In an embodiment of the system, game-like features may be employed to encourage progress by young users. For example, achievement of a certain number of the learning goals entitles a student to play 'stump the expert' in which the student asks the Expert Avatar a question in the Expert Avatar's field of knowledge. If the Expert Avatar cannot answer, the student can impose a penalty on the Expert Avatar, such as make him dance or take an ice bucket shower.

Thus, it can be seen from the foregoing description, that the present invention provides a novel, effective, and engaging educational system and method for teaching science, history, and other academic subjects, as well as career related learning, such as military, police, and fire training and in addition, facilitates the creation of Expert Avatars to augment any course material, or provide information on its field of expertise.

While certain novel features of the present invention have been shown and described, it will be understood that various omissions, substitutions and changes in the forms and details of the device illustrated and in its operation can be made by those skilled in the art without departing from the spirit of the invention.

We claim:

1. A method for on-line teaching and assessing a student in a subject matter, utilizing an interactive avatar, comprising the steps:
    (a) storing on electronic data-storage means:
        (i) a first database, said first database storing (A) an anticipated student query pertaining the subject matter, (B) a response to the anticipated query, (C) instructions for the delivery of said response by the interactive avatar, (D) an entry to be employed by learning manager software, said entry identifying a learning goal for the subject matter, (E) ranking of the anticipated query to indicate a relative importance to the learning goal, and (F) a prompt or suggestion to help guide the student to achieve the learning goal;
        (ii) a second database comprising student profile information including at least one of demographic information, credential information, and prior experience, a log documenting a communication between student and avatar, and an assessment of the student's progress in relation to the learning goal;
        (iii) a third database comprising information necessary to create a graphical user interface of the interactive avatar;
    (b) providing a first data entry means for entering data to create and update the first, second and third databases, the first data entry means comprising at least one of voice, keyboard, text, touch screen, gesture interface, display screen and mouse, or other form for entering data into said first, second and third databases and for entering a student query;
    (c) receiving a query from the student pertaining to the subject matter;
    (d) providing data-processing means for at least one of the following: (i) comparing a student-provided query with the anticipated query, (ii) selecting a response to the student-provided query, (iii) providing a suggestion of a topic for the student to explore, (iv) providing a question to the student, and (v) searching the first database for a first match response corresponding to an anticipated query stored therein;
    (e) providing first data outputting means for transmitting control information comprising the selected response to at least one of: (i) a display, (ii) a mechanical apparatus, (iii) audio output, and (iv) video output.

2. The method of claim 1, where the first database further comprises a test question to assess the student's understanding of the response with an expected answer to the test question.

3. The method of claim 1, where the data-processing means further comprises searching the first database for an alternative response corresponding to the anticipated query stored therein.

4. The method of claim 1 where the first primary database comprises a set of resources for each response, the set of resources comprise of at least one of: (a) a gesture, (b) a facial expression, (c) a movement, (d) a behavior, (e) a graphic, (f) a video, (g) a simulation, or (h) another interaction to be presented by the interactive avatar, and in which the third graphical user interface database contains instructions to cause the avatar to present said set of resources.

5. The method of claim 1 where the first data entry means is capable of at least one of:
   (a) converting a voice input to text form using automatic speech recognition software;
   (b) converting a non-verbal input to lexical form; and
   (c) converting at least one of a touch screen input, a gesture interface, a display screen interface, a mouse movement or other electronic input to lexical form.

6. The method of claim 1 where the first data entry means employs natural language processing software to do at least one of the following functions: correct spelling errors, translate slang, translate common shortcuts, correct common automatic speech recognition translation errors, and extract underlying meaning of a query.

7. The method of claim 1 where the first database comprises a facility for designating key words, topics, question forms, or other forms of a query in the anticipated query.

8. The method of claim 1 where the first database comprises a facility for designating alternative equivalent forms for the anticipated query.

9. The method of claim 1 further comprising providing a query processor to match an unanticipated query to an entry in the first database for delivery of a response to the unanticipated query.

10. The method of claim 9 in which a secondary query matching system is optimized to improve precision and recall of the delivery of the response through at least one of (a) testing systems driven by author-managed testing and validation content, and (b) system performance with live users, providing a feedback loop for system improvement.

11. The method of claim 10, in which a tertiary system is employed to find a response to a query using a secondary general knowledge base in the event that the primary and secondary query matching systems fail to find a match to the student query.

12. The method of claim 1 further comprising employing an author manager system to create at least one category of anticipated query and response in the first database, the author manager system comprising:
   (a) second data entry means to create or edit at least one record in the first database comprising a category of anticipated query and response;
   (b) second data processing means to convert the category of anticipated query and response to a more general form of the anticipated query that correspond to a response, said second data processing means comprising at least one of:
      (i) natural language processing to convert a query in the first database to a basic query,
      (ii) means to identify key words and assign appropriate weighting to emphasize important parts of the query and de-emphasize unimportant parts of the query,
      (iii) means to improve query matching using a dictionary of synonyms,
      (iv) means to create an equivalent query based on a type of the query,
      (v) means to create an equivalent query using a list of equivalent words or phrases particular to the interactive avatar and/or subject matter,
      (vi) natural language processing to create an equivalent query to improve a likelihood of a correct match, and
      (vii) means to search internet search engines for a variant of an anticipated query and retrieve such variant;
   (c) second data processing output means to convert a category of query, equivalent query and response into a format required by the second data processing means for selecting a response corresponding to the student query.

13. The method of claim 12 in which at least one anticipated query is obtained from an external data set of queries.

14. The method of claim 12 in which at least one anticipated query is obtained from an external search engine data set.

15. The method of claim 12 in which the interactive avatar is employed to solicit both an anticipated query and a response from an author to create the category in the first database.

16. The method of claim 1 in which a scripting or markup language is employed to select a response corresponding to the student query.

17. The method of claim 1 where the first data processing means further comprises using learning manager software to analyze the student's progress in making a query, receiving a response, and answering a test question, and providing an assessment of the student's achievement of the learning goal.

18. The method of claim 1 in which the learning manager software employs adaptive guidance to the student's progress toward the learning goal, encouraging learning of a lesser explored content by the student based on the student's progress in relation to the learning goal.

19. The method of claim 1, where the third database further comprises a set of accessories, objects, architecture, and other elements of an environment for the interactive avatar.

20. A system for teaching subject matter by allowing students to ask questions of a subject matter expert interactive avatar, the system comprising:
   a first database storing: (a) an anticipated query pertaining to the subject matter, (b) a response corresponding to the anticipated query, and (c) an instruction for the delivery by the interactive avatar of the response to the anticipated query;
   a second database storing student profile information, comprising a student's progress information;
   a third database storing user interface information, the user information comprising information for presenting the interactive avatar;
   a first data input means for receiving an input query and for creating and augmenting at least one of: (a) the first database, (b) the second database, and (c) the third database;
   data output means for transmitting at least one of: (a) the response, (b) the input query, and (c) student progress information; and
   data processing means for (a) searching the first database for a first match response of the input query corresponding to an anticipated query stored in the first database; and capable of at least one of: (b) delivering the first match response through the data output means; and (c) analyzing a student's progress in understanding the educational subject matter.

21. The system of claim 20, further comprising:
a fourth database storing general information pertaining to at least one of the subject matter and the interactive avatar; and
means for searching the fourth database to provide a response to a query in the event no match is found in the first database.

22. The system of claim 20, further comprising:
second data processing means capable of analyzing a response or a query which are not found in the first database or do not result in a first match response, and identifying an appropriate entry for addition to the first database to produce a first match response for a future response or future query.

23. The system of claim 20, where the data output means further comprises transmission of at least one of: (a) a two dimensional image, (b) a three dimensional image, (c) audio output, (d) video output, and (e) control of a mechanical device.

24. The system of claim 20, where the first data input means further comprises receiving at least one of: (a) text entry, (b) video capture, (c) audio input, and (d) touch screen input.

25. The system of claim 20, further comprising an authoring manager, the authoring manager comprising:
(a) second data entry means to create or edit at least one record in the first database comprising a category of anticipated query and response;
(b) second data processing means to convert the category of anticipated query and response to a more general form of the anticipated query that correspond to a paired response, said second data processing means comprising at least one of:
  (i) natural language processing to convert a query in the first database to a basic query,
  (ii) means to identify key words in the basic query and designate flexible matching patterns and variable word weighting within the basic query,
  (iii) means to improve query matching using a dictionary of synonyms,
  (iv) means to create an equivalent query based on a type of the query,
  (v) means to create an equivalent query using a list of equivalent words or phrases particular to the interactive avatar or subject matter,
  (vi) natural language processing to create an equivalent query to improve a likelihood of correct match, and
  (vii) means to search internet search engines for a variant of one or more anticipated queries and retrieve such variant;
(c) electronic data processing output means to convert a category of query, an equivalent query and response into a format required by the second data processing means for selecting a response corresponding to the student query.

26. The system of claim 20 in which the interactive avatar is employed to solicit both an anticipated query and a response from an author to create an entry in the first database.

27. The system of claim 20, where the first database further comprises at least one of: (d) a learning goal pertaining to the subject matter, (e) a follow up question to assess the student's understanding of the response, (f) guidance to help the student achieve the learning goal, and (g) a supplemental query and response thereto for enhancing the first database.

* * * * *